Aug. 20, 1968  L. R. TOTH ET AL  3,397,794
FILTER ELEMENT
Original Filed July 19, 1965
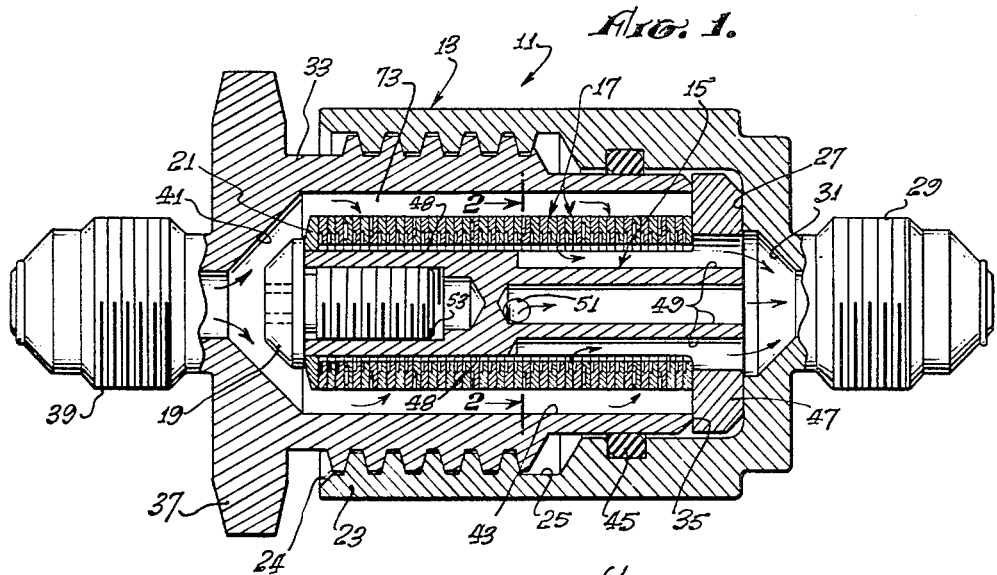
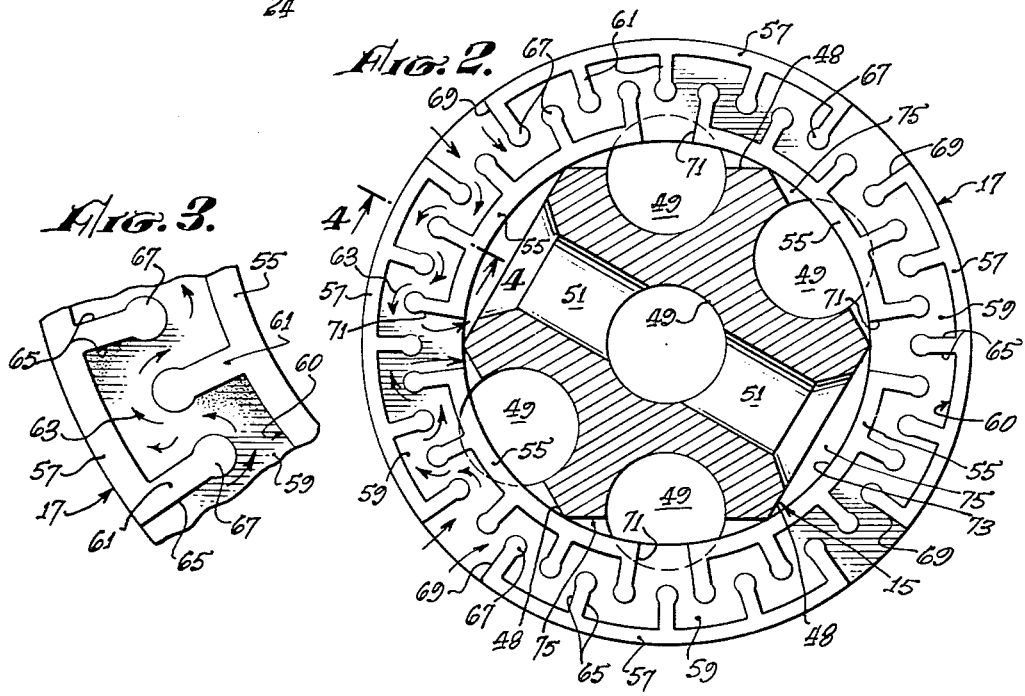
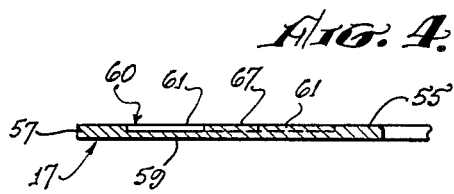
INVENTORS.
LOUIS R. TOTH,
ORVILLE A. KELLER,
BY THEIR ATTORNEYS.
HARRIS, KIECH, RUSSELL & KERN.

United States Patent Office 3,397,794
Patented Aug. 20, 1968

3,397,794
FILTER ELEMENT
Louis R. Toth, Montrose, and Orville F. Keller, Reseda,
Calif., assignors to California Institute Research Foundation, Pasadena, Calif., a corporation of California
Continuation of application Ser. No. 472,937, July 19, 1965. This application Feb. 8, 1968, Ser. No. 704,182
4 Claims. (Cl. 210—488)

ABSTRACT OF THE DISCLOSURE

A filter for removing particulate impurities from a fluid by inertial separation, comprising a stack of annular filter elements each having inner and outer walls respectively provided with interleaved radial baffles causing fluid to follow a serpentine path in flowing from inlet openings in one of the walls to outlet openings in the other. The ends of the baffles are enlarged to form restrictions serving to locally increase the fluid velocity and thus the inertial forces to which impurities in the fluid are subjected. The filter elements are stacked on a hexagonal core making only line contact therewith to provide between the core and the filter elements longitudinal flow channels for the fluid being filtered. With this construction, the openings in the inner walls of the filter elements communicate with such flow channels irrespective of the angular positions of the filter elements on the core.

---

This application is a continuation of my prior copending application Ser. No. 472,937, filed July 19, 1965, and now abandoned.

This invention relates to a device for filtering impurities and particulate matter from a fluid stream. The filter of this invention is particularly adapted for use with an explosive-operated valve to filter debris caused from the operation of such valve. However, the filter disclosed herein may have many applications including filtering a precipitate from a liquid, filtering the exhaust products from a power plant, or for general service in filtering a liquid or a gas.

In fluid systems employing an explosive-operated valve, a regulator is often positioned downstream from the explosive-operated valve. Operation of the explosive-operated valve allows the debris from the explosive to enter the fluid line and pass downstream to the regulator. This debris has been troublesome and caused leakage around the various seal members in the regulator. It is therefore desirable to interpose a filter between the explosive-operated valve and the regulator which will filter out substantially all of the debris.

Screen-type filters have not been suitable for this type of service or for many other applications where a very high degree of filtration is required. Because the screen-type filter cannot be adequately cleaned and inspected prior to use, such filters themselves introduce contamination into the fluid line. This "bulit-in" type of contamination found in the screen-type filters cannot be completely removed regardless of the cleaning procedure which is followed.

Accordingly, an object of this invention is to provide a filter which will obtain a high degree of filtration.

Another object of this invention is to provide a filter, the elements of which can be thoroughly cleaned and individually inspected to prevent such filter from introducing contamination into the fluid system in which it is to be placed.

Another object of this invention is to provide a filter which is of simple construction and is easily assembled and disassembled.

Another object of this invention is to provide a filter which may be assembled without indexing of the flow passages therethrough.

A further object of this invention is to provide a labyrinth filter which defines a serpentine fluid flow path to subject the fluid flowing therealong to inertial forces to separate the particulate matter therefrom and to collect the matter so separated.

According to another object of this invention the velocity of the fluid flow is increased immediately upstream of each change of direction of fluid flow to increase the centrifugal force to which the fluid is subjected to thereby improve filtration. More particularly, the velocity of the fluid flow is increased by providing a restriction in the fluid flow passage immediately upstream from each location at which the fluid is caused to change its direction of flow.

Another object of this invention is to provide a filter for removing particulate matter from a fluid including a housing having a housing inlet and a housing outlet and a plurality of annular stacked filter elements, each of the filter elements including generally radially opposed inner and outer walls defining fluid passage means, a filter element inlet communicable with the inlet of the housing, a filter element outlet communicable with the housing outlet, and interleaved baffle members extending generally radially outwardly and inwardly from the inner and outer walls, respectively, of the filter element into the interior of the passage means to define a serpentine path which repeatedly changes the direction of flow of the fluid to produce centrifugal forces for separating particulate matter from the fluid.

A further object is to provide the baffle members with lateral, radially-extending surfaces and end portions spaced from the opposite inner or outer wall of the corresponding filter element, the lateral surfaces and end portions of the baffle members and the inner and outer walls of the filter element directing the fluid along the desired serpentine path to subject the fluid to inertial force each time the fluid is subjected to a change of direction, the particulate matter being separated from the fluid by the inertial force and collected on and adjacent the lateral surfaces of the baffle members.

Still another object is to provide the baffle members with enlarged end portions which restrict the passage means to accelerate the fluid immediately upstream from each change in its direction of flow, thereby increasing the particle separating inertial forces applied thereto.

Another object of this invention is to provide a filter including a cup-shaped member having a side wall, an end wall, and an outlet communicating with the end wall; a core member seated against the end wall and including a peripheral flange and passage means extending generally longitudinally in the core and communicating with the outlet; annular filter means mounted on the core for filtering the impurity-laden fluid, the periphery of the filter means being spaced from the side wall, the annular filter means defining a fluid flow path which communicates with the passage means and the exterior of the filter means; means for retaining the annular filter means on the core; a tubular member secured to the cup-shaped member and having an annular end engaging the peripheral flange to clamp the core member firmly against the end wall of the cup-shaped member; and inlet means formed on the tubular member.

The invention, both as to its organization and method of operation, together with further objects and advantages thereof, may best be understood by reference to the following description taken in connection with the accompanying drawing in which:

FIG. 1 is a longitudinal sectional view through a filter constructed in accordance with the teachings of the invention;

FIG. 2 is an enlarged sectional view taken along line 2—2 in FIG. 1 and showing one of the filter elements and the core;

FIG. 3 is an enlarged fragmentary view of a portion of one of the filter elements showing the manner in which particulate impurities are collected thereby; and FIG. 4 is a sectional view taken along line 4—4 of FIG. 2.

Referring to the drawing and in particular to FIG. 1 thereof, reference numeral 11 designates a filter which includes a housing 13, a core member 15, a plurality of stacked annular filter elements 17 positioned on the core, and a screw 19 and a washer 21 for retaining the stacked filter elements on the core. The housing 13 includes a generally cylindrical cup-shaped member 23 having an open end 24, a side wall 25, an end wall 27, a threaded outlet fitting 29, and a housing outlet passage 31 passing through the end wall 27 and the fitting 29. A cover or tubular member 33 is threadedly secured to the cup-shaped member 23 and includes an annular end 35, a hex head 37, a threaded inlet 39, and a housing inlet passage 41 passing through the hex head 37 and the fitting 39. The tubular member 33 is preferably generally cylindrical, has an interior cylindrical wall surface 43 and is sealed to the cup-shaped member 23 by an O-ring 45. The inlet fitting 39 is adapted for connection to a supply of fluid to be filtered, either liquid or gas, and the outlet fitting 29 is adapted for connection to a fluid piping system.

The core member 15 includes a peripheral flange 47 which is clamped against the end wall 27 by the annular end 35. As illustrated in FIG. 2, the core member 15 is hexagonal in cross section and has flat portions 48 on the exterior surface thereof. Passageways 49 extend from the outlet 31 longitudinally through approximately one-half of the length of the core member. Four of the passageways 49 are arranged to form the four corners of a rectangle and a fifth passageway 49 is centrally located in the core member 15. Radial passageways 51 connect the central passageway 49 with the periphery of the core 15. The core 15 also includes a threaded socket 53 which receives the screw 19.

The annular filter elements 17 are mounted on the core 15 and are retained thereon by the washer 21 and the screw 19. A typical filter element 17 is illustrated in FIGS. 2–4. Each of the filter elements 17 includes an inner circular wall 55, an outer circular wall 57, a web 59 connecting the inner and outer walls to give the filter element a generally channel-shaped cross section, and a plurality of baffle members 61 extending generally radially and alternately from the walls 55 and 57 into the interior of the channel. As best seen in FIG. 4, each of the filter elements 17 has an open end 60, each of which preferably extends in the same direction.

The walls 55 and 57 and the baffle members 61 form a serpentine path 63 for the impurity-laden fluid. Each of the baffle members 61 has lateral surfaces 65 and an enlarged end portion 67 which is spaced from the opposite wall. The outer wall 57 has a plurality of filter element inlets 69 therein and the inner wall 55 has a plurality of filter element outlets 71 therein which communicate with the passageways 49.

The filter elements 17 are preferably very thin metallic elements and the serpentine path 63 is formed on one face of each of the filter elements 17 preferably by etching. By way of illustration, the filter element may be from about .0010 to .0020 inch thick. Also by way of illustration, the serpentine path 63 may be from about .0002 to about .0004 inch deep.

When the filter elements 17 are stacked on the core 15, they are contiguous and the web 59 of one element closes the open end 60 of the adjacent element. The screw 19 may be tightened sufficiently to urge the adjacent filter elements 17 into a fluid-tight abutting relationship. The outer wall 57 of each filter element 17 is spaced from the interior cylindrical wall 43 to define an annular passageway 73 which connects the housing inlet 41 with the filter element inlets 69. As shown in FIG. 2, the exterior surface of the core 15 engages the inner wall 55 of the filter element 17 along six longitudinally extending lines or narrow areas. The flat portions 48 of the core member 15 are spaced from the circular interior wall 55 to define six longitudinal passageways 75 which connect the outlets 71 with the passageways 49. Of course, the core member need not be hexagonal in cross section but preferably has a cross section which forms a regular polygon and the inner wall 55 of each of the filter elements 17 is preferably arcuate. The inner wall 55 could have the flattened portions and the core member 15 could be arcuate or circular in cross section. This also would allow the filter element outlets 71 to remain in continuous communication with at least one of the passageways 49 regardless of the transverse angular orientation of each of the filter elements 17 relative to the core member 15.

In using the filter 11, a fluid which may contain impurities is fed through the inlet 41 and the annular passage 73 to the plurality of inlets 69 located in the various filter elements 17. In getting from one of the inlets 69 to one of the outlets 71, the fluid must follow the serpentine path 63 defined by the various baffle members 61. As illustrated in FIG. 3, the fluid is required to experience numerous changes of direction thereby subjecting it to forces due to inertia. The inertial force throws the particulate matter outwardly against the lateral surfaces 65 and the adjacent areas illustrated in FIG. 3. Thus, the inertial force separates the particulate matter from the moving fluid stream.

As is well known, the amount of inertial force is proportional to the flow velocity. To increase the inertial force, the enlarged end portions 67 are provided to restrict the serpentine path 63 thereby increasing the velocity of flow. By positioning these restrictions slightly upstream from the location at which the fluid changes direction, the fluid is accelerated to a higher velocity as it reverses its direction. This serves to improve filtration.

Of course, the serpentine path may be of various lengths and may reverse the flow various numbers of times. Increasing the number of flow reversals will improve the filtration while decreasing the number of flow reversals will decrease the pressure drop across the filter 11. The pressure drop may also by decreased by increasing the depth of the serpentine path 63. The length of the serpentine path 63 may be increased by decreasing the number of inlets 69 and outlets 71 or by providing filter elements of larger diameter.

An important feature of this invention is that the filter elements need not be indexed, i.e. oriented, relative to the core member 15 during assembly. As the fluid passes from a filter element outlet 71, it is immediately moved into one of the longitudinal passageways 75 regardless of the transverse angular position of such filter element outlet relative to the core member 15. This is because the exterior surface of the core 15 engages the inner wall 55 of the filter element 17 only along six longitudinally extending lines or narrow areas and accordingly does not block any of the filter element outlets 71 as the lines or areas are narrower than the outlets 71. Accordingly, the fluid is free to flow through the longitudinal passageways 75 into the passageways 49 and out through the outlet 31.

Another important feature of this invention is that it can be quickly assembled and disassembled. The filter 11 may be completely disassembled by unscrewing the tubular member 33 and the screw 19 to allow the core 15 and the filter elements 17 to be removed. Each of the very thin filter elements 17 may then be thoroughly cleaned and inspected to assure that the filter will not introduce contamination into the fluid system. Of course, the filter elements can be cleaned and then reused. Assembly of the filter 11 is further simplified because the filter elements 17 need not be indexed but may be randomly mounted on the core 15.

Many changes, modifications, and substitutions may be made by one having ordinary skill in the art without necessarily departing from the spirit and scope of the invention.

We claim:

1. A filter for filtering impurities from a fluid comprising:
   (a) a generally cup-shaped member including a side wall, an end wall, and an outlet communicating with said end wall;
   (b) a core member seated against said end wall and including a peripheral flange and passage means extending generally longitudinally in said core and communicating with said outlet;
   (c) annular filter means mounted on said core for filtering the fluid, the periphery of said filter means being spaced from said side wall, said annular filter means defining a fluid flow path which communicates with said passage means and the exterior of said annular filter means;
   (d) means for retaining said annular filter means on said core;
   (e) a tubular member secured to said cup-shaped member and having an annular end engaging said peripheral flange to clamp the latter firmly against said end wall; and
   (f) inlet means formed on said tubular member.

2. In a filter, the combination of:
   (a) a housing having spaced inlet and outlet passages;
   (b) an elongated core within and carried by said housing;
   (c) a plurality of annular filter elements stacked on and encircling said core and oriented perpendicularly of the axis of said core;
   (d) means securing said stacked filter elements on said core;
   (e) each of said filter elements including annular inner and outer walls concentric with the axis of said core and joined by an annular web oriented perpendicularly of the axis of said core;
   (f) said annular inner and outer walls and said annular web of each of said filter elements cooperating with an adjacent filter element to provide an annular flow channel;
   (g) said inner and outer annular walls of each of said filter elements respectively having circumferentially spaced openings therein communicating with the corresponding one of said flow channels;
   (h) passage means connecting said openings in one of said annular walls of each of said filter elements to said inlet passage;
   (i) passage means connecting said openings in the other of said annular walls of each of said filter elements to said outlet passage;
   (j) one of said passage means being formed in said core;
   (k) each of said filter elements including interleaved baffles extending radially inwardly and outwardly, relative to the axis of said core, from its outer and inner annular walls, respectively, into the corresponding one of said flow channels, and extending axially, relative to said core, from the corresponding one of said annular webs;
   (l) whereby fluid flowing through each of said flow channels follows serpentine paths so that inertial forces are created tending to deposit particulate matter carried by the fluid adjacent the junctions of said baffles with said inner and outer walls; and
   (m) said baffles of each of said filter elements having substantially parallel sides and terminating in enlarged, bulb-like ends which provide therebetween flow restrictions for locally increasing the velocity of the fluid flowing through said flow channels so as to locally increase the inertial forces tending to deposit particulate matter from the fluid.

3. An annular, generally disc-shaped filter element comprising an annular planar web having inner and outer annular walls extending perpendicularly from the plane of said web, said inner and outer walls each having circumferentially spaced openings, said openings in said outer wall being angularly spaced from said openings in said inner wall, whereby said element has alternate openings in said inner and outer walls, baffles extending radially inwardly from said outer wall toward said inner wall and terminating a distance from said inner wall, baffles extending radially outwardly from said inner wall and terminating a distance from said outer wall, and said baffles extending from said inner and outer walls being interleaved to provide serpentine fluid flow channels between said alternate openings in said inner and outer walls.

4. A filter element as defined in claim 3 wherein each of said baffles has substantially parallel sides and terminates in an enlarged, bulb-like end, whereby to provide flow restrictions between adjacent baffles for locally increasing the velocity of fluid flowing through said flow channels so as to locally increase the inertial forces tending to separate particulate matter from the fluid.

References Cited

UNITED STATES PATENTS

| | | | |
|---|---|---|---|
| 984,705 | 2/1911 | Rarick | 210—492 X |
| 1,646,404 | 10/1927 | Herbert | 210—488 |
| 2,118,295 | 5/1938 | Crawford et al. | 210—488 X |
| 2,207,399 | 7/1940 | Gaertner | 210—84 X |
| 3,207,311 | 9/1965 | Kasten | 210—488 X |
| 3,273,374 | 9/1966 | Annett | 210—488 X |
| 3,240,347 | 3/1966 | Zievers et al. | 210—438 X |

FOREIGN PATENTS

| | | |
|---|---|---|
| 666,474 | 5/1929 | France. |
| 107,090 | 6/1917 | Great Britain. |
| 949,425 | 2/1964 | Great Britain. |
| 95,502 | 7/1922 | Switzerland. |

REUBEN FRIEDMAN, *Primary Examiner.*

J. DE CESARE, *Assistant Examiner.*

UNITED STATES PATENT OFFICE
CERTIFICATE OF CORRECTION

Patent No. 3,397,794 August 20, 1968

Louis R. Toth et al.

It is certified that error appears in the above identified patent and that said Letters Patent are hereby corrected as shown below:

Column 1, line 10, before "ABSTRACT OF THE DISCLOSURE" insert:

The invention described herein was made in the performance of work under NASA contract and is subject to the provisions of the National Aeronautics and Space Act of 1958, Public Law 85-568 (72 Stat. 426; 42 U.S.C. 2451), as amended.

Signed and sealed this 17th day of March 1970.

(SEAL)
Attest:

Edward M. Fletcher, Jr.                  WILLIAM E. SCHUYLER, JR.
Attesting Officer                         Commissioner of Patents